March 27, 1928.  
J. H. DE IONGH  
RAILWAY VEHICLE  
Filed April 1, 1927

1,663,626

J. H. de Jongh
INVENTOR

By Marks & Clerk
ATTYS.

Patented Mar. 27, 1928.

1,663,626

UNITED STATES PATENT OFFICE.

JOHAN HENDRIK DE IONGH, OF HILLIGERSBERG, NETHERLANDS.

RAILWAY VEHICLE.

Application filed April 1, 1927, Serial No. 180,305, and in the Netherlands October 7, 1926.

This invention relates to railway vehicles having two radial axles driven by one or two laterally movable axles arranged between them.

Railway vehicles of the above type are known in which the radial axles turn about vertical axes located in or adjacent their mid-points. In such cases the carriage body is supported by means of rollers which are mounted on supporting frames carried resiliently by each radial axle. In another known construction the radial axles are controlled by a two-axled frame running freely beneath the vehicle and the weight of the carriage body is taken, through the medium of springs, by a bridge member which presses by means of a small turntable on the radius rod of the radial axle near the middle of the axle. These constructions possess serious disadvantages, the principal of which is that the radial adjustment of the axles presents difficulties.

The invention has for its object to simplify and improve such known constructions in such manner that the disadvantages referred to are avoided and the axles can be exactly adjusted radially without difficulty. The pivot of each radial axle is located, in the vehicle in accordance with the invention, just as it is in the known construction last referred to in the preceding paragraph, not in the axle itself but externally of the latter at some distance therefrom towards the centre of the vehicle. In vehicles having a long wheel base and for which the present invention is mainly intended this distance may be rather considerable. In the known construction above referred to which is intended only for motor vehicles, this arrangement is not possible since the weight of the carriage body at the pivot rests on the under frame and an increase in the distance between this point and the (driven) radial axle reduces the adhesion weight of the vehicle. According to the invention the pivot of the radial axle is wholly relieved of the weight of the carriage body, this weight being transferred to the required extent to the radial axles by means of springs which press at the left and at the right hand side of the middle of each axle on a housing surrounding the axle. A swinging movement of the axle about its external pivot is facilitated by transferring the spring pressure to the axle housing by means of rollers which permit lateral deviation of the axle, while the consequential displacement in the longitudinal direction of the vehicle of the point of application of the pressure of the springs is facilitated by the springs themselves following this displacement in consequence of their connection with the carriage body.

Figure 1:
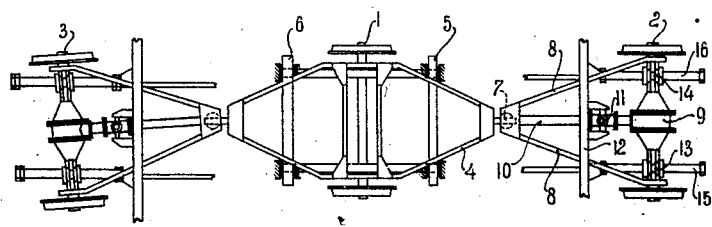
Figure 2:
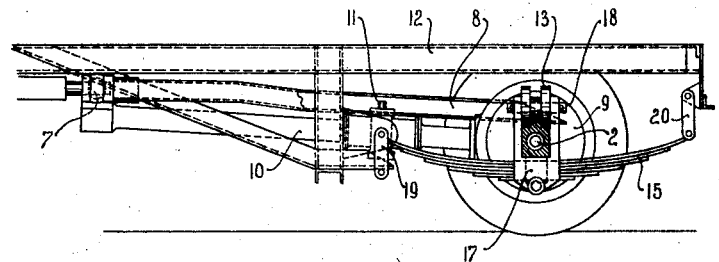

For a fuller explanation of the invention reference is directed to the accompanying drawing which shows the under frame of a vehicle in accordance with the invention. Fig. 1 is a plan view showing the laterally movable axle and the right hand radial axle in the position which they assume on a straight track; the left hand radial axle is shown in the position which it assumes on a curved track on which the other axles may also be assumed to lie. Fig. 2 shows a radial axle in cross section, Fig. 3 in an end elevation partly in longitudinal section.

Referring to the drawing, the under frame has a laterally movable axle 1 and two radial axles 2 and 3. The former is mounted in a frame 4 which is guided by means of rods 5 and 6 laterally in relation to the carriage body. The frame 4 is connected by a coupling 7, rotatable in all directions and movable in the longitudinal direction, with a frame which consists of rods 8, an axle housing 9 and a central rod 10. The rod 10 carries the pivots 11 for the radial axle 2 which pivots are movable vertically in bushes mounted on brackets of the carriage frame 12.

Figure 3:
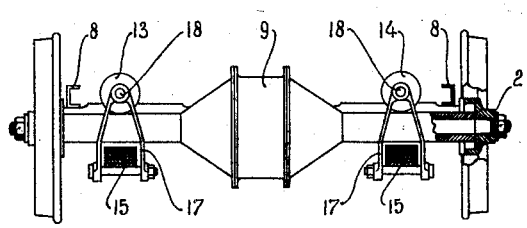

At the left and at the right hand sides of the centre of the radial axle 2 rollers 13, 14 run on the axle housing 9 which is enlarged midway of its length for the purpose of increasing the moment of resistance, the bands of the springs 15, 16 on which the carriage rests at this end being hung on said rollers. Figs. 2 and 3 show this part of the construction in greater detail. Each spring 15 is suspended in its band 17 on a bolt 18 which forms the axle of the roller 13 or 14; it is connected by means of shackles 19 and 20 to the frame 12 of the carriage and is free to move in its band to such an extent as to remain parallel to the longitudinal axis of the carriage when the spring band turns with the radial axle. The left hand end of Fig. 1 illustrates the position occupied by the parts on a curved track.

What I claim is:—

A railway vehicle having two radial axles which are controlled by a laterally movable axle located between them characterized by this, that the pivot of the radial axle is located externally of this axle at some distance therefrom towards the laterally movable axle and the radial axles are surrounded by housings over which run rollers having springs suspended thereon, such springs being movable in the longitudinal direction of the carriage and connected with the carriage body.

In testimony whereof I affix my signature.

J. H. DE IONGH.